United States Patent [19]

Whaling

[11] Patent Number: 5,239,918

[45] Date of Patent: Aug. 31, 1993

[54] METHOD AND DEVICES FOR HUSKING AND CRACKING MACADAMIA NUTS

[76] Inventor: William Whaling, Waiohinu Homesteads, Lot 42A, Waiohinu, Hi. 96772

[21] Appl. No.: 939,099

[22] Filed: Sep. 1, 1992

[51] Int. Cl.$^5$ ............................................. A23N 5/00
[52] U.S. Cl. ..................................... 99/571; 99/580; 99/581; 30/120.2
[58] Field of Search .......... 99/568, 571, 572, 580–583, 99/600, 609, 518, 519; 426/481, 482; 30/120.2, 120.1, 120.3–120.5

[56] References Cited

U.S. PATENT DOCUMENTS

| | | | |
|---|---|---|---|
| 758,665 | 5/1904 | Kimball | 99/519 |
| 1,504,009 | 8/1924 | Wilms | 99/580 |
| 1,598,076 | 8/1926 | Galleazzi | 99/580 |
| 2,759,511 | 8/1956 | Jacobson | 99/519 |
| 4,441,414 | 4/1984 | Quantz | 99/571 |
| 4,467,710 | 8/1984 | Verma et al. | 99/582 |
| 4,515,076 | 5/1985 | Reznik | 99/571 |
| 4,598,637 | 7/1986 | Brown et al. | 99/568 |
| 4,699,049 | 10/1987 | Mizer | 99/568 |
| 4,805,527 | 2/1989 | Yoshihara | 99/571 |

FOREIGN PATENT DOCUMENTS 2638947  5/1990  France ............................ 99/571

*Primary Examiner*—Timothy F. Simone
*Attorney, Agent, or Firm*—Beehler & Pavitt

[57] ABSTRACT

Means for cracking and removing the inner shell of a Macadamia nut after its outer shell has been husked off comprising a vertical open top tubular member having a side wall opening with a nut feeder tube, and disposed upon a hard transverse surface, the inside diameters of the tubular member and its side opening and feeder tube all being such as to allow passage of nuts through them. Yielding means are provided to limit the entry of nuts from the feeder tube into the tubular member through the side wall opening and a grippable ram is slidably disposed in the tubular member for movement upward above the side wall opening, and forceful movement back down the tubular member past the yieldable means to crack a nut which has entered the tubular member through the side wall opening against the hard transverse surface on which the tube is disposed.

5 Claims, 5 Drawing Sheets

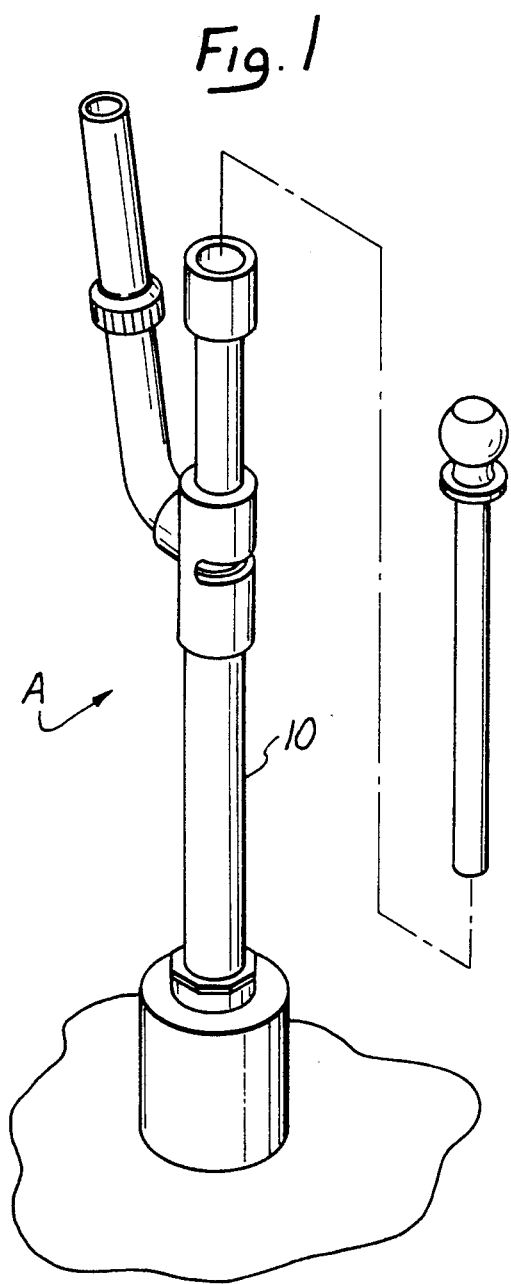
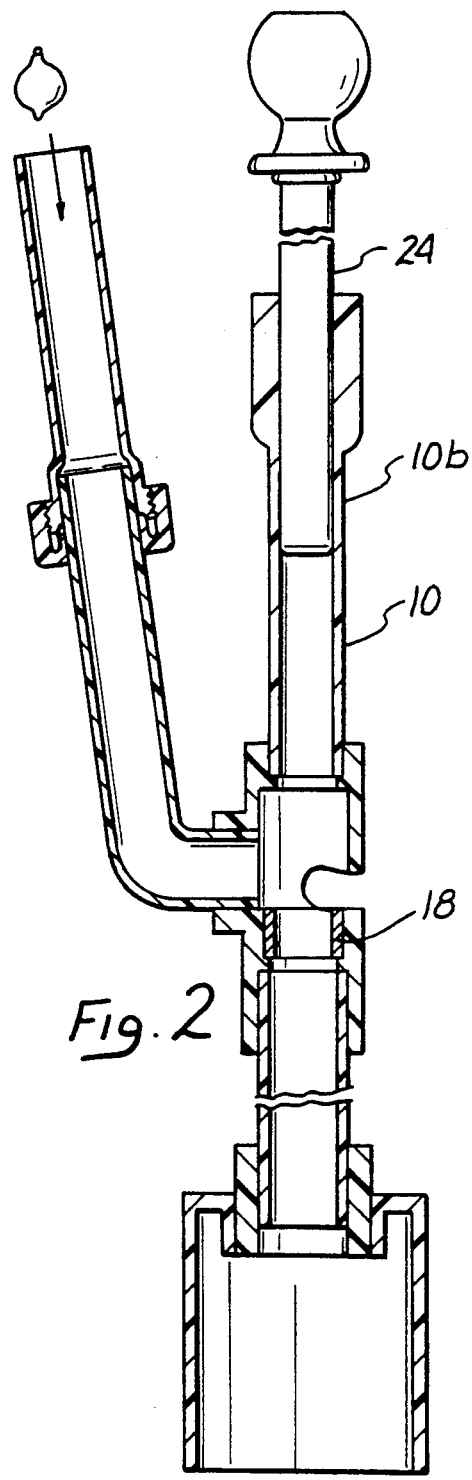

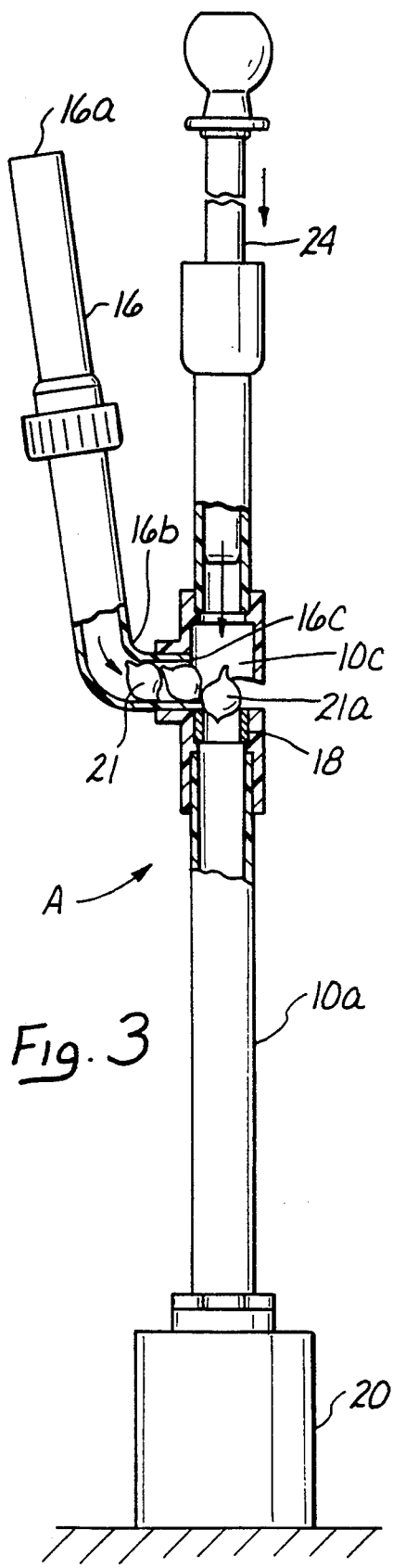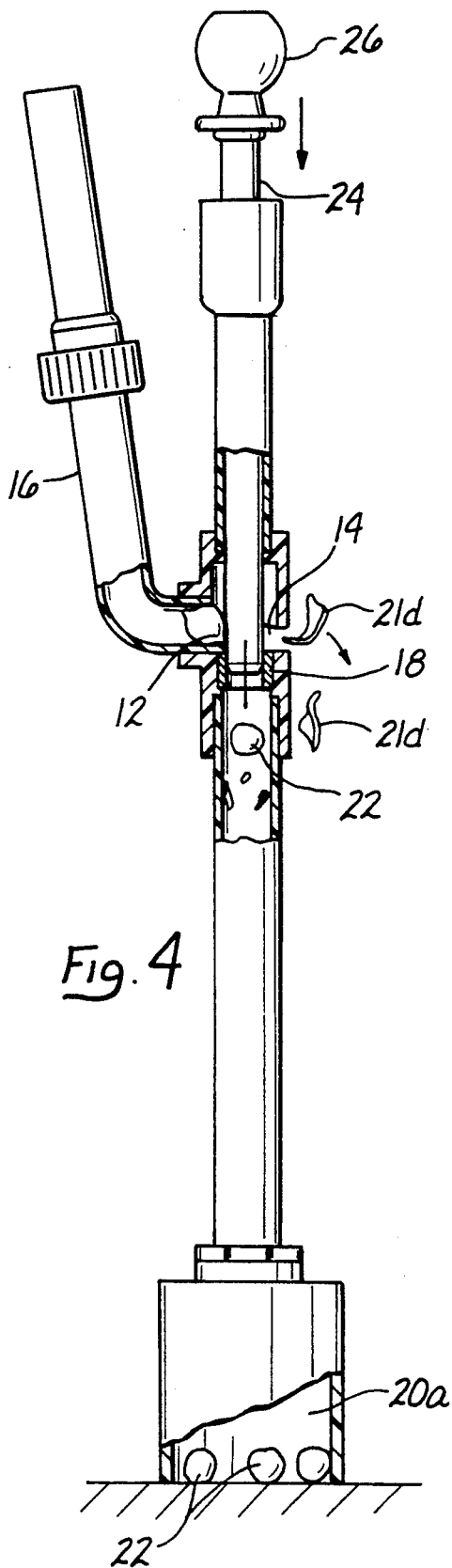

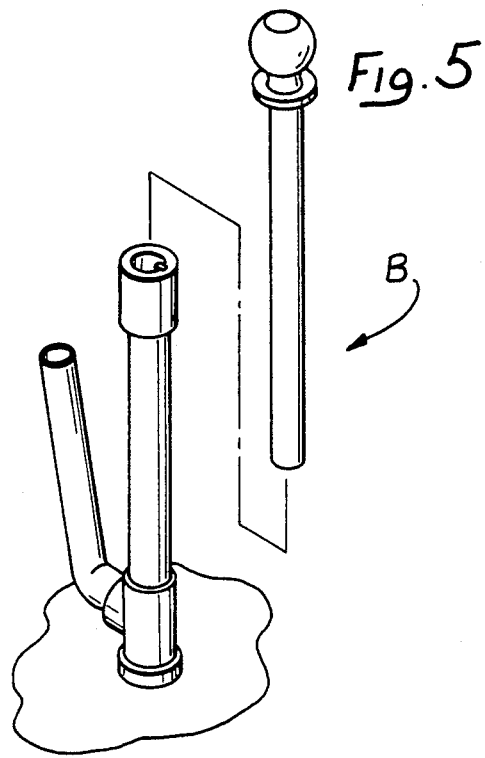
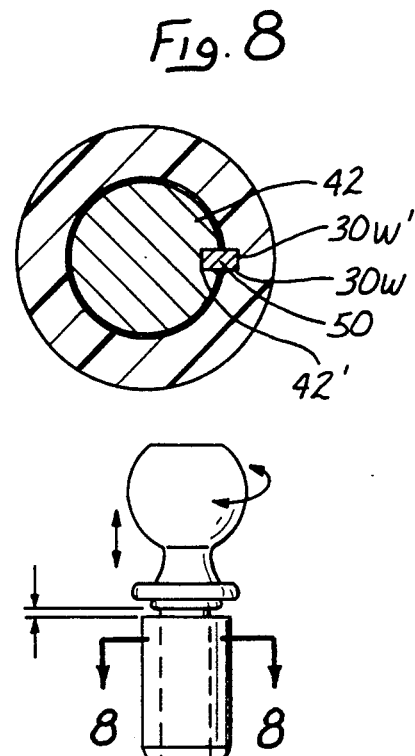
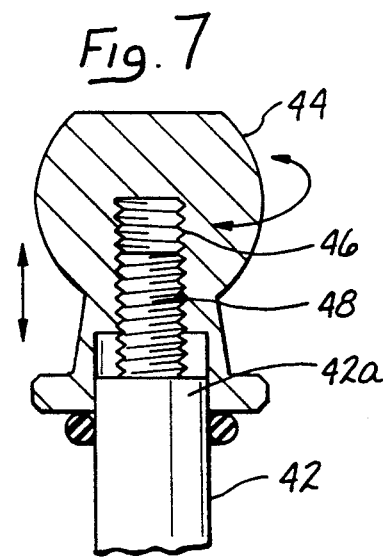
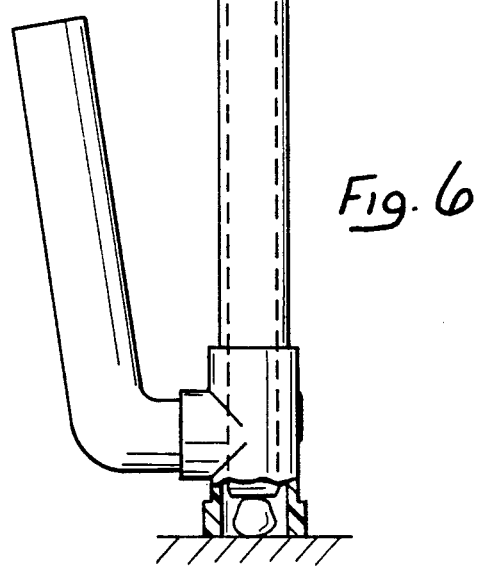

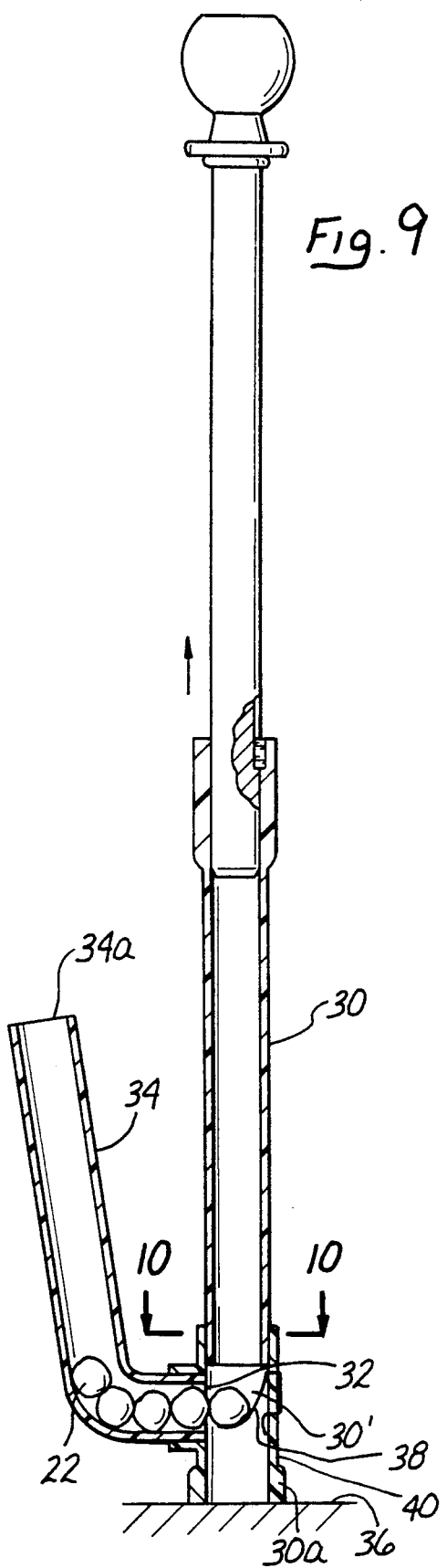
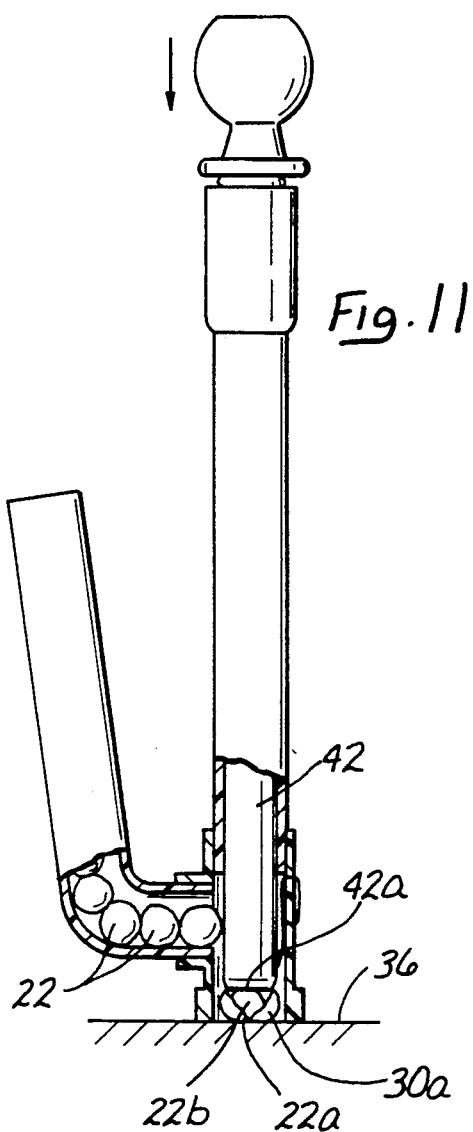
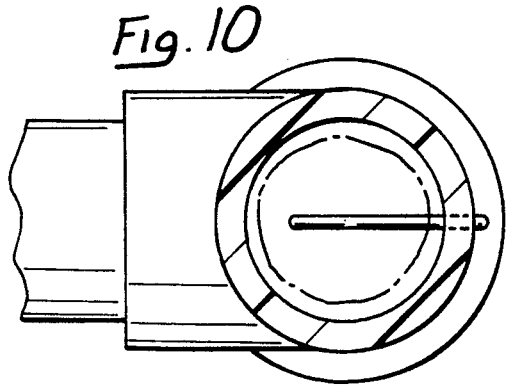

METHOD AND DEVICES FOR HUSKING AND CRACKING MACADAMIA NUTS

FIELD OF THE INVENTION

This invention relates to the field of mechanical devices and methods for extracting the edible portion of nuts, such as Macadamia nuts, which have an inner shell in contact with such edible portion (the nut meat) and protective outer shells.

DESCRIPTION OF THE PRIOR ART

Macadamia nuts are generally found in limited areas of the World, such as Hawaii and the tropical band of Northern Australia. The nuts are unique in that the edible portion or nut meat is encased in a hard inner shell which itself is surrounded by a thicker and difficult to remove outer shell.

Because of the structure of Macadamia nuts, it is extremely difficult to remove both shells in order to extract the inner edible nut—so much so that as a practical matter, the shells have not been easily removable manually, but only by means of large expensive mechanical equipment. Such equipment for husking has heretofore comprised a pair of heavy parallel cylinders provided with radiating projections, which cylinders are rolled toward each other in almost tangential engagement, with the nuts being passed down between the cylinders to accomplish husking of the outer shells. The thus husked nuts are then passed through rotating finger-like devices, the object of which is to crack the inner shells and enable the cracked shells to be separated from the inner edible meat portions of the nuts.

Among the problems which arise from the husking and cracking of Macadamia nuts by use of such prior art equipment are the cost of the equipment, the damage to the meat portions of a high proportion of the nuts passed through such equipment, and the relatively extensive amount of time required for husking and cracking the nuts. Thus, the available equipment has been so expensive that few companies have found it economically feasible to invest in acquiring such equipment and in order to set themselves up for the husking and cracking of Macadamia nuts. Indeed, to the knowledge of the present applicant, there are only two such facilities in all of Hawaii, with the result that Macadamia nut farmers must transport their nuts substantial distances to the processing facilities and generally, in effect, must "stand in line" to have their nuts processed. Because of this situation, the cost of obtaining the extracted edible portions from the nuts is high, so that the price of the nuts from which the shells have been husked and cracked is far above what the average Macadamia nut farmer receives for nuts which he has harvested from his property. Moreover, when a farmer cannot have his Macadamia nuts processed reasonably promptly, the nuts which he has gathered tend to become moldy and inedible.

In addition, because the husking and cracking equipment at the available facilities is somewhat ponderous, an unacceptability high percentage of the nuts becomes improperly husked and cracked, with the result that the inner nut meat portions become damaged so they cannot be sold as whole nuts and sometimes must be discarded altogether.

There has thus existed a great need for an inexpensive and efficient means and method for husking and cracking Macadamia nuts so that the farmers themselves may acquire the needed equipment and practice the method, thereby reducing the cost of husking and cracking the nuts and saving a greater percentage of the edible portions of the nuts which are being husked and cracked.

SUMMARY OF THE INVENTION

The present invention provides a method utilizing two simple devices which enable any Macadamia nut farmer to husk and crack nuts which are grown on his own property in a manual manner at a cost which should be affordable to most farmers. The method comprises first, providing a husking device in the form of a vertical tubular member with a lateral feeding tube into which nuts to be husked and cracked are deposited. As each nut after the first enters the vertical tubular member from the feeding tube through a first opening in the wall of the tubular method, it is restrained from passing into the vertical tubular member by the presence of the preceding nut which is seated in a rigid annular means having an inside diameter less than the inside diameter of the tubular member, but sufficient to permit passage of a husked nut down through the remainder of the tubular member to exit at the lower end of the latter. A second opening in the tubular member is provided slightly below the level of, and opposite the first opening at the level of the upper end of the annular restraining means to permit the discharge through the second lower opening of outer shells when they have been husked from the annular restraining means. A ram is provided to slide up and down and closely within the inside of the upper portion of the tubular member, the ram having a length extending from the annular restraining means to a level above the upper open end of the tubular member. The upper end of the ram desirably is provided with gripping means.

After a nut is seated on the annular restraining means, husking is effected by lifting the ram up in the tubular member and slamming it back down against the seated nut, with the result that the outer shell of the nut is effectively husked from the inner shell, with the husks passing out of the second opening in the tubular member. The thus husked nut drops down through the annular restraining means to be removed from the lower open end of the tubular member.

The husked nut is then placed in means for cracking and removing the inner shell, which means includes a hard transverse surface and another vertical tubular member open at its top and bottom with an inside diameter sufficient to allow passage of a husked nut therethrough. This tubular member is also provided with a feeding tube through which a husked nut may be dropped to enter the vertical tubular member through an opening in its side wall. Such opening may be spaced from the lower end of the tubular member and the hard transverse surface on which it is placed by a distance approximating the diameter of the husked nut which is to be cracked. Yielding means are provided to restrain the entry of each nut from the feeder tube into the tubular member through the opening in the wall of the tubular member. A ram is slideably disposed within the tubular member, the ram having a length extending from a level slightly below the opening in the wall of the tubular member to the upper end of the tubular member which is provided with gripping means. In order to crack a nut, which is initially held by the yielding restraining means from fully entering the tubular member, the ram is first lowered into the tubular member to force the restrained nut past the yielding means and onto the hard transverse surface. After such disposition of the nut, the ram is raised back up in the tubular means and then driven down forcefully onto the thus disposed nut, thereby cracking the inner shell of the nut and separating it from the edible portion of the nut. By raising the tubular member from the transverse surface, the nut meat portion of the nut may be picked up and the cracked shell brushed away for discard or other disposition.

While the hard transverse surface may comprise a concrete floor or metal plate, in the preferred embodiment of the invention, such hard surface may be formed by a metal plug insertable in the base of the tube. In this embodiment, the lower end of the tube may be provided with an extension, the inside wall of which is threaded, or lined with a threaded rubber or other sleeve to receive a heavy threaded bolt which is inserted in the extension of the tube and screwed into the lined extension. Preferably, the bolt's head is cut or formed at a slight angle, and an outlet opening is provided in the tube wall flush with, or slightly below, the point in the tube where the lower portion of the angled cut bolt head is disposed in the tube. The ram, in this embodiment, impacts the nut against the angled head of the bolt to crack the nut and discharge both the nut and shell fragments through the adjacent opening in the tube wall.

Since the husking and cracking tubular devices may be fabricated of a plastic, such as polyvynil chloride or polystyrene, once the cost of the mold has been amortized, these parts, as well as the yielding restraining elements and annular restraining means may be made and assembled quite inexpensively. Similarly, the ram may be fabricated inexpensively of bar stock and axially slotted to prevent rotation in the tube. The hard surface could be a steel plate, a concrete or cement flooring or a metal plug in the lower end of the tube. The devices to practice the method, therefore, should be able to be made at a cost which could be afforded by any individual Macadamia nut farmer, who may employ unskilled labor to husk and crack nuts in accordance with the present invention. This can be accomplished at a fairly rapid rate so that as many as sixty nuts can be husked in a minute and a greater number of inner shell nuts can be cracked and their meat centers extracted.

Moreover, it will be found that with proper devices to practice the present invention, neither the husking nor the cracking of the nut will result in damage to the edible portion of the nut, thereby wastage of nuts is minimized.

DESCRIPTION OF THE DRAWINGS

In the accompanying drawings:

FIG. 1 is a perspective view of a husker employed in the first step of the method of the present invention.

FIG. 2 is an enlarged side elevation partly in section of the husker as shown in FIG. 1.

FIG. 3 illustrates the manner in which the husking is accomplished by an initial step.

FIG. 4 illustrates the final steps in the husking of a nut.

FIG. 5 is a perspective view of the device used for cracking the inner shell of the nut after it has been husked in accordance with the present invention.

FIG. 6 is an enlarged side elevation of the cracking device shown in FIG. 5 partly in section.

FIG. 7 is an enlarged view of the gripping means at the top of the ram shown in FIGS. 5 and 6.

FIG. 8 is a section taken on the line 8—8 of FIG. 6.

FIG. 9 illustrates the initial step employed in the cracking process.

FIG. 10 is a section taken on the line 10—10 of FIG. 9.

FIG. 11 shows the final step whereby the inner shell of the nut is cracked and parted from the nut meat which had been enclosed within the shell.

DESCRIPTION OF THE PREFERRED EMBODIMENT

Figure 12:
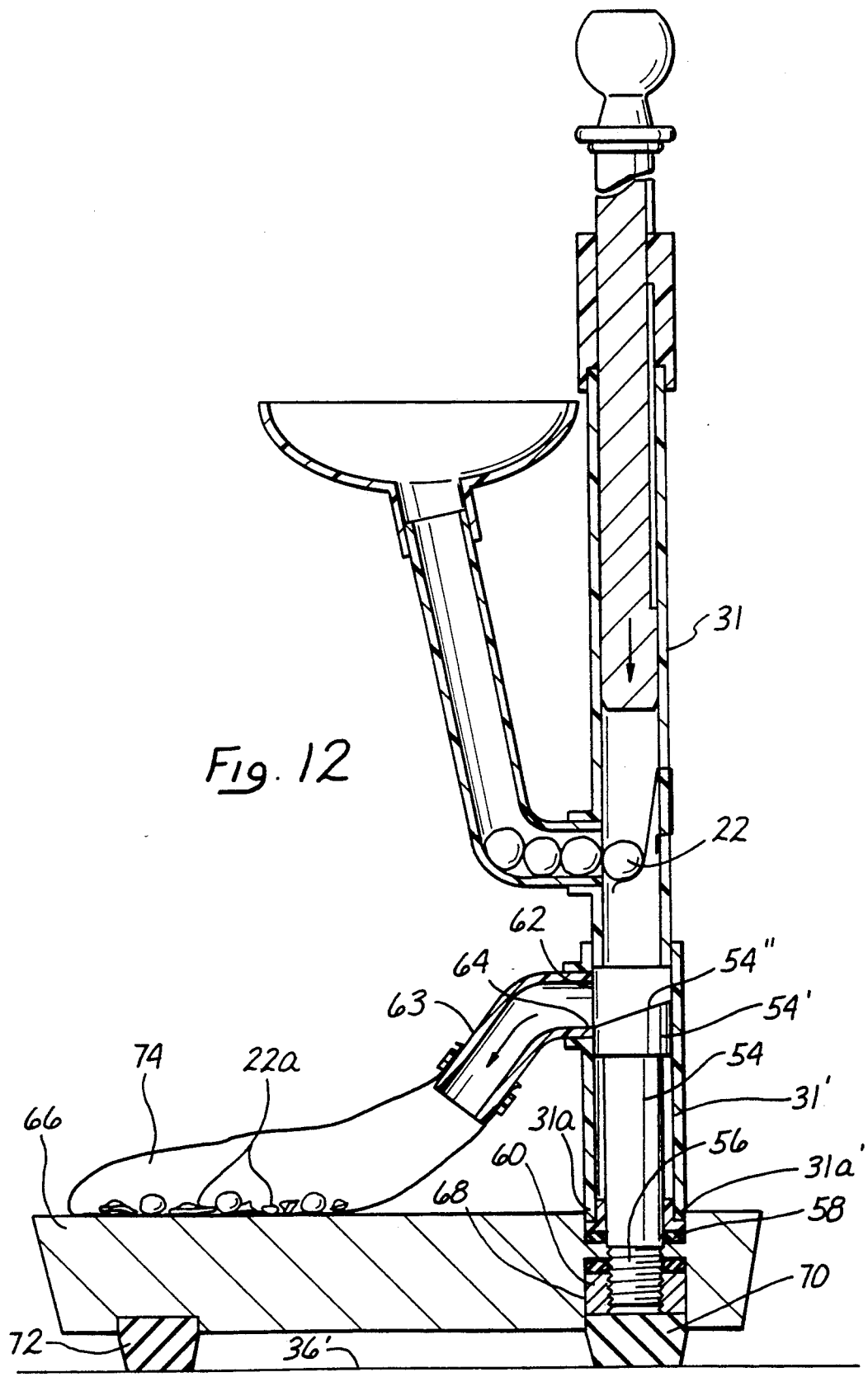
FIG. 12 is a side elevation of a portion of another embodiment of the nut cracker.

The practice of the present invention for husking and cracking Macadamia nuts requires the use of two similar, yet different devices, namely the husker A illustrated in FIGS. 1 through 4 and a cracker B disclosed in FIGS. 5 through 11, inclusive. The first device serves to accomplish the husking steps whereby the outer shell of the nut is removed from the inner shell, and the second device serves to complete the process by removing the inner shell from around the edible meat portion of the nut.

Considering first the husker A shown in FIGS. 1-4, it is comprised of a vertical tube 10 which may or may not be segmented, provided with a first opening 12 in its side wall and a second slightly lower opening 14 in the opposite side of the wall or, at least, angularly displaced from the first opening 12. The first opening 12 serves to receive a feeder tube 16. Disposed on a level with the bottom of the opening 14 is an annular restraining element 18, the diameter of which is less than the diameter of any nut which is to be husked. The annular element 18 should be of a metal or some other material which can withstand repeated impacts and remain fixed in its disposition within the tube 10. The lower portion of the tube 10a may extend downwardly down from the annular element 18 to a base member 20, which may support the tube 10 and, being hollow, may receive husked nuts 22 as thus shown in FIG. 4. A ram 24, desirably of a heavy metal, is provided and disposed in the upper end 10b of the vertical tubular member 10. This ram should be of a length to extend from a point above the upper opening of the tubular member 10 down into the annular element 18 and has a gripping ball 26.

The second device needed to complete the husking and shelling process is a cracker B as illustrated in FIGS. 5 through 11. This cracker also has a vertical tube 30 with a side wall opening 32 above its lower open end 32a. A feeder tube 34 terminates at its lower end 34b in the opening 32 and serves to conduct husked nuts 22 which may be deposited in the upper open end 34a of the feeder tube 34. The cracker B, in order to function, requires a hard transverse surface 36. In order that only one nut 22 may be fed into the tube 30 through the feeder tube 34, a yielding spring-like element 38 is provided in the wall 40 opposite the opening 32. The opening 32 desirably is adjacent the open end 30a of the tubular member 30.

A ram 42 similar to ram 24 in the husker is provided to slide up and down within the tube 30. The ram, however, should be of a length which is less than the full length of the tube 30 so that, when slid down through the tube 30, it does not contact the hard surface 36. Desirably, the extent to which the ram, when pressed fully down into the tube 30 will approach the transverse surface 36 may be adjusted by a flanged cap 44 having a threaded interior 46 to receive a screw-type end 48 on the upper end 42a of the ram 42, as best shown in FIG. 7.

In the preferred embodiment of the cracker shown in FIG. 12, instead of relying upon a concrete floor or metal plate to provide the entire hard surface against which the nut is cracked, as in the device shown in FIGS. 5-11, the lower end of the tube 31 is provided with an extension 31' to receive and support a metal plug 54, the upper end 54' of which is formed with an angle 54". This plug 54 may be in the form of a large diameter bolt having threading 56 to be screwed into mating threading 58 provided either in the inner wall 31w of the tube extension 31'; or preferably in a resilient sleeve 60 secured within the wall 31w. In this embodiment, a second opening 62 is provided in the tube extension 31', the lower lip 64 of which opening 62 is at least flush with the lower edge 54" of angled top 54" of the plug 54, if not below such edge 54"'. The opening 62 may communicate with a discharge guide 63.

In this preferred embodiment, the lower end 31a' of the tube extension 31' is secured on a ground surface and supported by the board 66 which is bored at 68 to permit the lower end 31a' of the tube extension 31a' to be passed through in a close fit. The lower end 31a' may be seated on a rubber or other resilient cap 70 which extends below the board 66 for a short distance, e.g. ½ inch. To level the board 66, a plurality of feet 72 are provided to extend below the bottom of the board 66 by the same distance as the cap 70 extends.

Desirably, as shown in FIG. 8, the ram 42 and wall 30w of the tube 30 are axially slotted at 42' and 30w' respectively, to enable a key element 50 to be secured in the ram slot 42' so as to prevent the ram 42 from being rotated in the tube 30 and to limit the stroke of the ram 42 in the tube 30. However, other mating configurations could be provided between the tube 30 and the ram 42 to accomplish the same result.

Utilizing the two devices thus described and illustrated in FIGS. 1-4 and 5-12, respectively, the method of the present invention may be explained as follows: Unhusked feeder nuts 21 are deposited in the mouth 16a of the feeder tube 16 to descend to the bend 16b in the tube 16 to line up for feeding through the tube discharge opening 16c. The first nut 21a, upon leaving tube opening 16c, arrives in that part of the vertical tubular member 10 which can be in the form of a chamber 10c, but can pass no further than seating on the annular restriction 18, as best shown in FIG. 3. The ram 24 is then drawn upwardly in the tube 10 and then brought down forcefully against the thus seated nut 21a, with the result that the outer shell is fragmented and stripped from the inner shell covered nut 22', as best shown in FIG. 4. The thus husked nut 22 is then able to pass through the annular restriction 18 and down through the lower portion 10a of the tube 10 and into the chamber 20a defined by the cylindrical base 20.

At this point, the thus husked nuts 22 are taken over to the cracker B and dropped into the mouth 34a of the feeder tube 34 through which tube 34 they descend to exit through the tube mouth 32. However, since the resilient restraining element 38 catches the first nut 22, only one nut may enter the chamber 30' defined by the lower end 40 of the tube 30. With the tube 30 set up on the hard surface 36, the ram 42 is first raised as shown in FIG. 9 and then brought down forcefully on to the nut 22 which is held in the chamber by the yielding restraining element 38. As the latter element yields, the ram forces the nut 22 down past the yielding element 38 on to the hard surface 36 where the impact of the ram 42 removes the shell 22a from the meat portion 22b, as shown in FIG. 1. Desirably, the stroke of the ram should be limited by adjustment of its threaded cap 44 shown in FIG. 7 to prevent the lower end of the ram from approaching the hard surface 36 to where it not only cracks the shell 22a of the nut 22, but crushes the nut meat 22b against the hard surface 36. After each nut 22 has been thus cracked, the entire cracker B is lifted from the hard surface 36 to enable the meat portion 22b and the cracked shells 22a to be removed from the lower end 30a of the tube 30 in order to make room for the next nut to be forced down by the ram end 42a for cracking on the hard surface 36.

Where the cracker of FIG. 12 is employed, the ram 42' is operated in the same manner as in the FIGS. 5-11 embodiment just described, except that instead of impacting the nut 22 against the hard surface 36, the ram 42' impacts the nut 22 against the angled plug top 54" to crack the nut. The nut 22 and its cracked shell fragments 22a then roll or drop out of the opening 62 and down the discharge guide 63 into a collector bowl 74. Desirably, the resilient cap 70 should, with the feet 72 extending below the board 66, rest upon some hard transverse surface 36' so as to yieldingly support the lower plugged end 31a' of the tube extension 31' when the ram is brought down forcefully to impact upon the nut 22 as it rests on the angled upper end 54' of the plug 54.

From the foregoing description, with reference to the accompanying drawings, it will be appreciated that the method of this invention is simple and easy to practice, so that the husking and cracking of double shelled nuts, such as Macadamia nuts may be accomplished by unskilled laborers and at a rate which will be found to be economically effective. Moreover, since the devices required may be manufactured and sold at relatively inexpensive prices, it is economically feasible for them to be purchased and used by any Macadamia nut farmer who has a substantial nut harvest which he desires to market.

I claim:

1. A means for cracking and removing the inner shell of a substantially spherical nut, such as a Macadamia nut, containing nut meat, from which nut the outer shell has been husked, said means comprising:

a hard transverse surface;

a vertical open tubular member of a predetermined length and having an upper open end and an open lower end, and further having an inside diameter sufficient to allow passage of the nuts therethrough, said member having an opening in its wall intermediate its ends adjacent the transverse surface, and spaced from said transverse surface by a distance at least as great the diameter of the nut to be cracked;

a nut feeder tube, said nut feeder tube being of substantially the same inside diameter as the diameter of the vertical open tubular member, the feeder tube having an upper open end to receive nuts, and a lower end communicating with the vertical tubular member through the opening in its wall;

yielding means to restrain the entry of each nut in the feeder tube into the tubular member through its wall opening, the lower end of said tubular member being placed upon and normal to the said transverse surface; and a ram slideably disposed within said tubular member, said ram being cylindrical and having an outside diameter such as to be slideable closely within the tubular member and having an length extending from a level slightly below the opening in the wall of the tubular member to the upper open end of the tubular member, the upper end of said tubular member being provided with gripping means;

whereby the ram may be advanced down the tubular member to force a nut past the yielding means onto the transverse surface and further advanced forcefully onto the nut so deposited, to crack its shell for removal of the latter from the nut meat.

2. The means as described in claim 1 wherein the length of the ram insertable in the tubular member may be adjusted appropriately to crack nuts of different diameters on the transverse surface.

3. The means as disclosed in claim 2 wherein the adjustment is accomplished by the gripping means which are flanged to a diameter greater than the diameter of the tubular member, and the disposition of the gripping means on the upper end of the ram may be varied so as to permit a different extent of the ram length to be insertable in the tubular member.

4. The means as described in claim 1 wherein the transverse surface comprises the top of a metal plug secured in the lower end of the tubular member, said top of said plug being disposed below the yielding means, and being angled relative to the axis of the tubular member, and said tubular member having a second opening below the other opening and with its lower edge at least flush with the lower side of said angled top of the metal plug, whereby the ram impacts each nut on said angled transverse surface to crack the nut and the nut meat and resulting shell fragments pass out of the tubular member through the second opening.

5. The means as described in claim 4 wherein the tube with the metal plug is supported resiliently upon a hard second transverse surface.

* * * * *